(12) United States Patent
Remboski et al.

(10) Patent No.: US 11,424,652 B2
(45) Date of Patent: Aug. 23, 2022

(54) LUBRICANT SUPPORTED ELECTRIC MOTOR INCLUDING MAGNETIC ROTOR CENTERING

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE); Bruno Patrice-Bernard Lequesne, Menomonee Falls, WI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 57 days.

(21) Appl. No.: 17/073,637

(22) Filed: Oct. 19, 2020

(65) Prior Publication Data
US 2021/0119508 A1   Apr. 22, 2021

Related U.S. Application Data

(60) Provisional application No. 62/916,820, filed on Oct. 18, 2019.

(51) Int. Cl.
*H02K 1/32* (2006.01)
*H02K 1/14* (2006.01)
(Continued)

(52) U.S. Cl.
CPC .............. *H02K 1/32* (2013.01); *H02K 1/14* (2013.01); *H02K 1/2753* (2013.01); *H02K 5/12* (2013.01);
(Continued)

(58) Field of Classification Search
CPC .... B60K 7/0007; F16N 2210/18; H02K 1/14; H02K 1/146; H02K 1/24; H02K 1/2753;
(Continued)

(56) References Cited

U.S. PATENT DOCUMENTS 5,852,334 A * 12/1998 Pengov ............... H02K 19/103
310/179
5,939,813 A    8/1999 Schob
(Continued)

FOREIGN PATENT DOCUMENTS

WO    WO-2006118219 A1 * 11/2006 ............. H02K 1/145
WO    WO-2007100255 A1 *  9/2007 ............. H02K 1/146

*Primary Examiner* — Naishadh N Desai
(74) *Attorney, Agent, or Firm* — Dickinson Wright PLLC

(57) ABSTRACT

A lubricant supported electric motor including a stator presenting a stator raceway, and a rotor extending along an axis and rotatable relative to the stator. The rotor presents a rotor raceway disposed in spaced relationship with the stator raceway to define a gap there between. A lubricant is disposed in the gap for supporting the rotor relative to the stator. The rotor includes a plurality of rotor poles arranged adjacent the rotor raceway in circumferentially spaced relationship with one another, and the stator includes a plurality of stator poles extending radially towards the rotor in circumferentially spaced relationship with one another along the stator raceway. A plurality of stator coil windings are wrapped around the plurality of stator poles and individually controllable for generating a magnetic force to center the rotor within the stator with carefully-timed adjustments to magnetic fields generated by the stator.

10 Claims, 3 Drawing Sheets

(51) Int. Cl.
  *H02K 1/2753* (2022.01)
  *H02K 5/12* (2006.01)
  *B60K 7/00* (2006.01)
  *H02K 1/24* (2006.01)

(52) U.S. Cl.
  CPC ........ *B60K 7/0007* (2013.01); *F16N 2210/18* (2013.01); *H02K 1/24* (2013.01)

(58) Field of Classification Search
  CPC .... H02K 1/2766; H02K 1/32; H02K 2201/03; H02K 5/12; H02K 5/1677; H02K 7/09; H02K 9/19
  See application file for complete search history.

(56) References Cited

U.S. PATENT DOCUMENTS

| | | | |
|---|---|---|---|
| 6,351,048 B1* | 2/2002 | Schob | H02P 6/08 310/68 B |
| 2019/0093757 A1* | 3/2019 | Remboski | H02K 5/20 |

* cited by examiner

LUBRICANT SUPPORTED ELECTRIC MOTOR INCLUDING MAGNETIC ROTOR CENTERING

CROSS-REFERENCE TO RELATED APPLICATION

The subject application claims priority to U.S. Provisional Application Ser. No. 62/916,820 filed on Oct. 18, 2019, the entire disclosure of which is incorporated herein by reference.

FIELD OF THE DISCLOSURE

The present disclosure relates to electric devices, such as electric motors and electric generators. More particularly, the present disclosure relates to a lubricant supported electric motor.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations are one alternative arrangement for the traditional ICE prime mover that distributes the prime mover function to each or some of the plurality of wheels via one or more motors disposed on, within, or proximate to the plurality of wheels. For example, in one instance, a traction motor, using a central shaft through a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, the disclosure of which is incorporated herein by reference, can be utilized as the "on wheel", "in wheel" or "near wheel" motor configuration. While each of these motor configurations result in a smaller size and lighter weight arrangement as compared to the prime movers based on the internal combustion engine, they each have certain drawbacks and disadvantages.

For example, the utilization of traction motors as the "on wheel", "in wheel" or "near wheel" configuration still results in motors that are too heavy and not robust enough to shock loading to be useful for wheel-end applications. These traction motors also must be supported by rolling element bearings typically at each end of the electric motor shaft, making them too heavy and large to be practical for wheel end applications. These conventional rolling element bearings also have limited ability to sustain (absorb) large, sudden shocks and also consume significant space within the electric motor that does not contribute to torque production.

Similarly, the utilization of a lubricant supported electric motor as the "on wheel", "in wheel" or "near wheel" motor in an automotive or land vehicle application results in an arrangement with some performance issues when it is subjected to the wide range of dynamic forces encountered during operation at the wide range of speeds encountered in a prime-mover application. Lubricant supported electric motors also typically do not include rotor and stator structures that are sufficiently designed to function as bearings. More specifically, the prior arrangements of lubricant supported electric motors are not optimally designed for rotor position stabilization and centering relative to the stator during an "un-park" initialization, transient operating conditions or at resonant critical speeds. For example, when the lubricant supported electric motor is in a stopped or "parked" position, it is necessary to center the rotor relative to the stator (to "un-park" the rotor and start the machine). During this "un-park" initialization, a pump is often used to pressurize a lubricant disposed between the rotor and stator for lifting the rotor. However, inclusion of this pump adds cost and complexity to the system. Also, in order to accomplish rotor stabilization when the lubricant supported electric motor is in motion, hydrostatic pressure is often utilized to act on a select portion of the rotor for centering the rotor within the stator. However, this hydrostatic pressure may not be the lowest cost and most efficient means for centering the rotor, and then maintaining rotor centering, during operation. Accordingly, there remains a continuing need for a lubricant supported electric motor which improves bearing performance, while providing the lighter and smaller footprint sought from alternative prime mover implementations.

SUMMARY OF THE INVENTION

The subject invention is directed to a lubricant supported electric motor including a stator presenting a stator raceway, and a rotor extending along an axis and rotatable relative to the stator. The rotor presents a rotor raceway disposed in spaced relationship with the outer raceway to define a gap therebetween. A lubricant is disposed in the gap for supporting the rotor relative to the stator. The rotor includes a plurality of rotor poles arranged adjacent the rotor raceway in circumferentially spaced relationship with one another, and the stator includes a plurality of stator poles extending radially towards the rotor in circumferentially spaced relationship with one another along the stator raceway. A plurality of stator coil windings are distinctly wrapped around a respective one of the plurality of stator poles and individually controllable for generating a magnetic force to center the rotor relative to the stator with carefully-timed adjustments to magnetic fields generated by the stator. The magnetic rotor centering of the lubricant supported electric motor advantageously reduces or eliminates the hydrostatic bearing support, and the requirement for a lubricant pump, as required by the prior art designs. The magnetic rotor centering also provides improved dynamic response to rotor positioning. Other advantages will be appreciated in view of the following more detailed description of the subject invention.

BRIEF DESCRIPTION OF THE DRAWINGS

The drawings described herein are for illustrative purposes only of selected aspects and not all possible implementations, and are not intended to limit the scope of the present disclosure.

DETAILED DESCRIPTION OF THE ENABLING EMBODIMENTS

Example embodiments of a lubricant supported electric motor in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
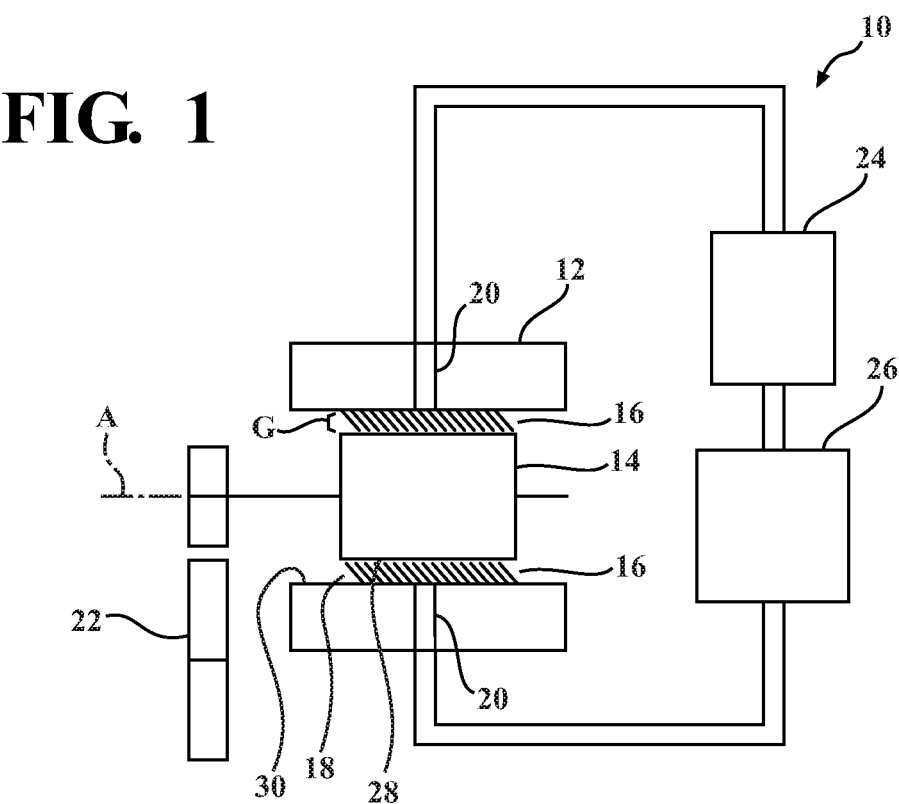
FIG. 1 is a cross-sectional side view of an exemplary lubricant supported electric motor illustrating a rotor extending along an axis and rotatably disposed within a stator to define a gap therebetween and a lubricant disposed within the gap for supporting the rotor within the stator.

FIG. 1 illustrates a lubricant supported electric motor 10 in accordance with an aspect of the disclosure. As best illustrated in FIG. 1, the lubricant supported electric motor 10 includes a stator 12 and a rotor 14 extending along an axis A and movably (i.e., rotatably) disposed within the stator 12 to define a gap 16 (also shown as "G") therebetween. In an alternative arrangement, the stator 12 and the rotor 14 can be reversed, with the stator 12 extending along the axis A and the rotor 14 rotatably disposed around the stator 12 without departing from the scope of the subject disclosure.

A lubricant 18 is disposed in the gap 16 for supporting the rotor 14 within or around the stator 12, and providing continuous contact between these components. The lubricant 18 may therefore act as a buffer (e.g., suspension) between the stator 12 and the rotor 14 minimizing or preventing contact therebetween. In other words, the lubricant 18 prevents direct contact between the stator 12 and rotor 14 and provides an electric lubricant supported electric motor 10 which is robust to shock and vibration loading due to the presence of the lubricant 18. Additionally, and alternatively, a substantially incompressible lubricant 18 may be used in order to minimize the gap between the stator 12 and the rotor 14. For very high speed motors, a compressible lubricant (i.e. a gas) may also be used.

As further illustrated FIG. 1, the stator 12 defines a passageway 20 disposed in fluid communication with the gap 16 for introducing the lubricant 18. However, the passageway 20 could be provided on any other components of the lubricant supported electric motor 10 without departing from the subject disclosure. According to an aspect, the lubricant 18 may be cycled or pumped through the passageway 20 and into the gap 16 in various ways. For example, a high pressure source (e.g., a pump) 24 of the lubricant 18 may be fluidly coupled to a low pressure source (e.g., a sump) 26 of the lubricant 18, where the lubricant 18 may move from the lower pressure source to the high pressure source, through the passageway 20 and into the gap 16. Rotation of the rotor 14 relative to the stator 12 may operate as a self-pump to drive lubricant 18 through the passageway 20 and into the gap 16.

As further illustrated in FIG. 1, the rotor 14 is preferably interconnected to a drive assembly 22 for coupling the lubricant supported electric motor 10 to one of the plurality of wheels of a vehicle. For example, in one instance, the drive assembly 22 may include a planetary gear system. Alternatively, the drive assembly 22 may include one or more parallel axis gears. However, the rotor 14 could be directly coupled to the wheel of the vehicle, without departing from the scope of the subject disclosure. The stator 12 and rotor 14 are configured to exert an electromagnetic force therebetween to convert electrical energy into mechanical energy, moving the rotor 14 and ultimately driving the wheel coupled to the lubricant supported electric motor 10 via the drive assembly 22. The drive assemblies 22 may provide one or more reduction ratios between the lubricant supported electric motor 10 and the wheel in response to movement of the rotor 14.

Figure 2:
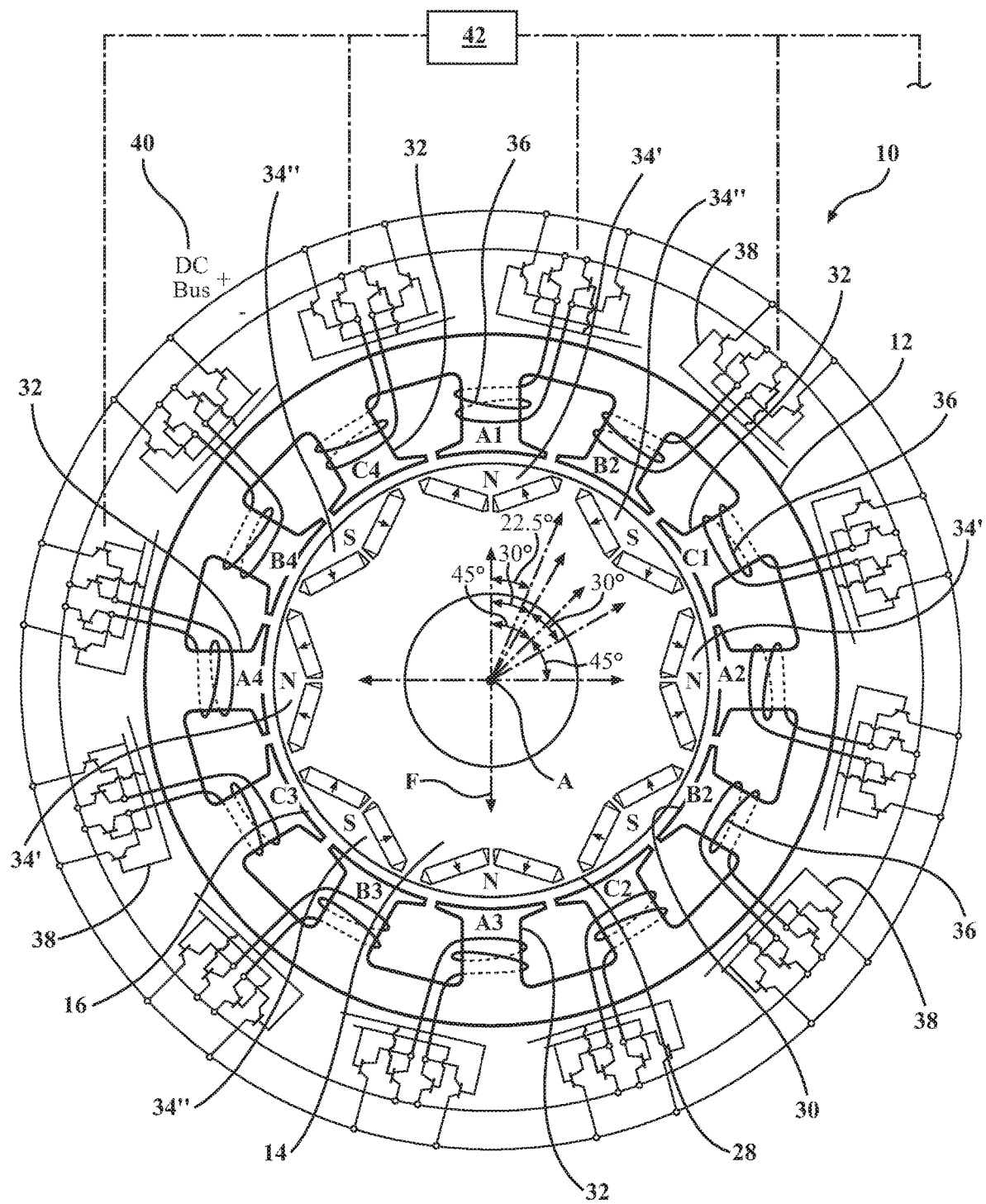
FIG. 2 is a cross-sectional end view of the lubricant supported electric motor illustrating a plurality of stator poles extending radially towards the rotor and circumferentially spaced from one another about the axis and a plurality of rotor poles disposed in circumferentially spaced relationship with one another along a rotor raceway in radially spaced relationship with the plurality of stator poles.

As best illustrated in FIGS. 1-2, the rotor 14 presents a rotor raceway 28 (arranged as an outer raceway in the Figures) and the stator 12 presents an stator raceway 30 (arranged as an inner raceway in the Figures) disposed in opposing relationship to the rotor raceway 28. However, when the arrangement of the stator 12 and the rotor 14 relative to the axis A are reversed, the respective raceways 28, 30 similarly swap, with the stator raceway 30 arranged as the outer raceway and the rotor raceway 28 arranged as the inner raceway.

In either arrangement, and as best illustrated in FIG. 2, the stator 12 includes a plurality of stator poles 32 extending radially towards the rotor 14 and circumferentially spaced from one another about the axis A along the stator raceway 30. The rotor 14 includes a plurality of rotor poles 34', 34" disposed in circumferentially spaced relationship with one another and circumferentially aligned along the rotor raceway 28. In other words, each of the rotor poles 34', 34" extend circumferentially along the rotor raceway 28 and are disposed in radially spaced relationship with the stator poles 32. The plurality of rotor poles 34 preferably include a plurality of north rotor poles 34' and a plurality of south rotor poles 34", with each one of the north rotor poles 34' disposed between two south rotor poles 34". In other words, the plurality of north rotor poles 34' and the plurality of south rotor poles 34" are circumferentially staggered along the rotor raceway 28 in alternating relationship with one another. As a result of this staggered relationship, each one of the north rotor poles 34' is preferably radially aligned with another one of the north rotor poles 34' to form sets of diametrically opposed north rotor poles 34' along the rotor raceway 28. Similarly, each one of the south rotor poles 34" is preferably radially aligned with another one of the south rotor poles 34" to form sets of diametrically opposed south rotor poles 34" along the rotor raceway 28. For example, FIG. 2 illustrates a lubricant supported electric motor 10 including twelve stator poles 32 and eight rotor poles 34', 34" with two sets of diametrically opposed north rotor poles 34' and two sets of diametrically opposed south rotor poles 34" circumferentially arranged along the rotor raceway 28 in staggered relationship with one another.

As further illustrated in FIG. 2, the lubricant supported electric motor 10 includes a plurality of stator coil windings 36 which are preferably each individually and separately wrapped around a respective one of the plurality of stator poles 32. In other words, each one of the stator poles 32 is uniquely wrapped with a stator coil winding 36 that is distinct from and not shared by any of the other stator poles 32. At least one power transistor 38 is electrically connected to the plurality of stator coil windings 36 and configured to individually and distinctly control current passing through each one of the stator coil windings 36, such as to alternatively energize respective stator poles 32 between a north stator pole and a south stator pole arrangement. In other words, the power transistor 38 is configured to drive current through a select stator coil winding 36 in either direction without effectuating control of any of the other stator coil windings 36. In a preferred arrangement, and as best illustrated in FIG. 2, the at least one power transistor 38 preferably includes a plurality of power transistors 38 each individually and electrically connected with a respective one of the stator coil windings 36 to effectuate individualized and distinct control of each stator pole 32. The plurality of power transistors 38 may be placed in an H-bridge configuration (as shown exemplarily in FIG. 2), a half H-bridge configuration, or some other configuration known in the art. The power transistors 38 are preferably connected to a DC bus 40 and preferably driven in a pulse width modulated mode to achieve the desired coil current. The power transistors 38 can be placed outside of the lubricant supported electric motor 10 in a typical power inverter package. Alternatively, and as shown in FIG. 2, the power transistors 38 can also be placed very near the stator winding coils 36 that are driven by the power transistors 38. In this case, the power transistors 38 can be cooled by the same lubricant flow that cools the stator 12 and the rotor 14, which can achieve a packaging and cost advantage.

A controller 42 is electrically connected to each power transistor 38 and configured to manage individualized control of the power transitions 38 based on the following described needs of the lubricant supported electric motor 10. More specifically, individualized control of the stator coil windings 36 associated with each stator pole 34 provides for magnetically centering the rotor 14 within the stator 12 during "un-park" initialization, transient operating conditions and/or at resonant critical speeds without the need for the pumps and hydrostatic pressure required by the prior designs. In a preferred arrangement, this individual control of the stator coil windings 36 can be used to create (i.e., generate) magnetic forces to repel the rotor 14 on diametrically opposite sides. In other words, the controller 42 is configured to individually control stator coil windings 36 disposed on diametrically opposed stator poles 32 based on a position of the north rotor poles 34' or the south rotor poles 34" relative to these diametrically opposed stator poles 32. The resulting magnetic repulsion is intended to be nearly equal on opposite sides of the rotor 14, which creates a net centering effect of the rotor 14 within the stator 12.

For example, and with reference to FIG. 2, according to one mode of operation, the stator winding coils 36 associated with the diametrically opposed stator poles 32 designated by A1 and A3 can be biased to create magnetic north stator poles when a set of diametrically opposed north rotor poles 34' are disposed adjacent and aligned with A1 and A3, generating opposing magnetic forces that will tend to center the rotor 12 in the stator 14. During starting ("un-park"), especially if the lubricant supported electric motor 10 has been at rest for an extended period of time, the rotor 14 rests on a bottom (i.e., lower) portion of the stator raceway 30, such that the rotor 14 is directly touching the stator 12, with no lubrication in-between the stator 12 and the rotor 14. Through this individualized control of the diametrically opposed stator poles 32, further designated by A1 and A3 and which are aligned with a gravitational force F of the lubricant supported electric motor 10, the rotor 14 can advantageously be lifted by the repelling magnetic (north/south) forces during an "un-park" initialization.

Even more specifically, according to an aspect of the disclosure, a special algorithm may be contemplated for starting the lubricant supported electric motor 10 and facilitating "un-park" initialization. During normal operation, the gap 16 between the stator 12 and the rotor 14 is lubricated, and the purpose of centering is to provide smooth, oscillation-free operation of the lubricant supported electric motor 10 (or at least minimized oscillations) as well as consistent lubrication. For proper starting, there is a need to lubricate this location. As stated in the background section, a prior art method to achieve lubrication is to pressurize the lubricant with a pump 24, such that the pressure of the lubricant lifts the rotor 14 and operation of the lubricant supported electric motor 10 can commence. With the circuits described above, the rotor 14 can alternatively be lifted by repelling magnetic (north/south) forces, such as but not limited to (1) controlling the currents in the individual stator coil windings 36 so as to balance the rotor 14 in the center of the stator 12; (2) lift the rotor 14 and allow the rotor 14 to come back down, possibly a few times, sufficiently to ensure lubricant has seeped in between the stator 12 and the rotor 14. The first method is preferred as it can provide a smooth start of the lubricant supported electric motor 10, but the second method is simpler to implement and in some applications may be sufficient. In either method, immediately after an initialization routine or more to the point, as a final step in such an initialization routine, the lubricant supported electric motor 10 phases are excited such as to initiate rotation.

In an alternative mode of operation, the amount of rotor centering required can be adjustable by individually modifying current in select ones of the stator winding coils 36 in response to run conditions (such as speed or torque) known to create unstable conditions for the rotor 14, or in response to a measured non-centered or unstable condition of the rotor 14, or in response to measured or inferred external forces acting on the lubricant supported electric motor 10 (e.g., external shock or vibration). For example, with further reference to FIG. 2, during any one of these conditions, the rotor 14 may operate off-center and biased towards a right portion of the stator 12, as defined relative to the axis A. In response to detecting this unstable condition, the stator winding coils 36 associated with the diametrically opposed stator poles 32 designated by A2 and A4 can be biased to create (i.e., generate) magnetic north stator poles when a set of diametrically opposed north rotor poles 34' are disposed adjacent and radially aligned with A2 and A4, generating opposing magnetic forces that once again will tend to center the rotor 12 in the stator 14.

Figure 3:
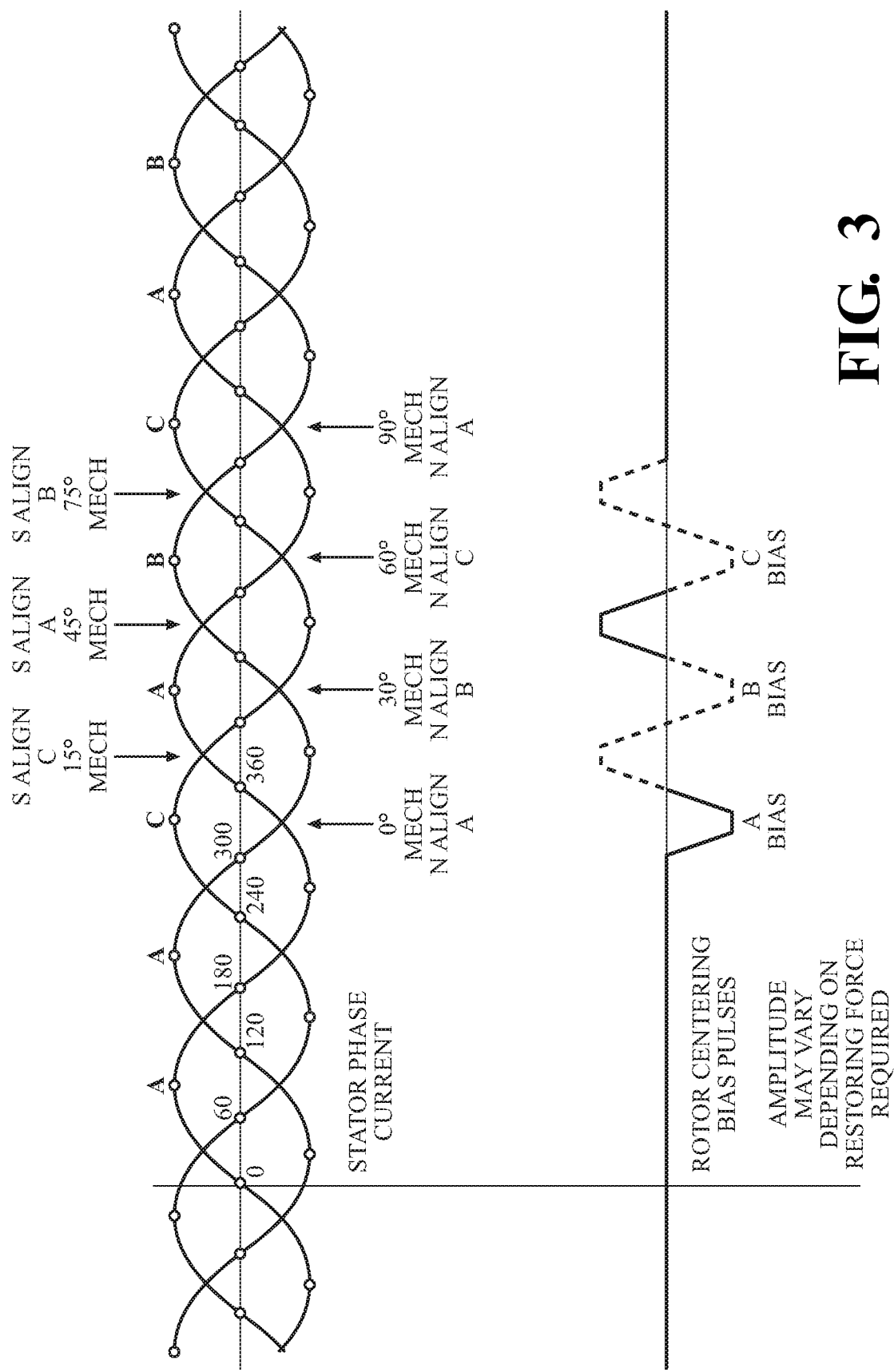
FIG. 3 is a graph illustrating centering pulses and stator phase currents of a typical three-phase lubricant supported electric AC motor, according to an aspect of the disclosure.

FIG. 3 illustrates a chart of phase currents in a typical 3-phase lubricant supported electric AC motor 10, showing an exemplary operation of rotor centering based on centering pulses and stator phase currents generated in the diametrically opposed stator poles 32 based on a position of mechanical alignment of the diametrically opposed sets of rotor north poles 34' and rotor south poles 34". These points of mechanical alignment are shown assuming (approximately) quadrature magnetic offset between rotor 12 and stator 14. In this example, a trapezoidal bias is applied to the individual phases as shown in the lower graph. These exemplary bias pulses will create a magnetic repulsion between stator 12 and rotor 14 used for rotor centering as described in more detail throughout this description section. Additionally, amplitude of these bias pulses may vary depending on a restoring force required to re-center the rotor 14 within the stator 12. According to an aspect of the disclosure, in the case of a polyphase excitation system, the centering magnetic flux will link or combine two or more adjacent poles, for example A1 and B1, etc., so the stator magnetic poles are not limited to just A poles, or B or C poles, but several or all of the poles in combination, such as increase a magnitude of the bias depending on the restoring force required. According to another aspect of the disclosure, for rotors without sets of diametrically opposed rotor poles, a suitable vector sum of forces around the rotor 14 can be created to center the rotor 14, such as illustrated in FIG. 2 by the exemplary vectors originating from the axis A.

According to an aspect of the disclosure, the controller 42 can be configured to use a Clark-Park transform (with direct (d) and quadrature (q) parameters) method for computing the desired phase currents, and a time-varying adjustment to the direct (d) parameter can be used to create a similar magnetic repulsion to that described above.

Preferably, the magnetic forces acting on the opposite sides of the rotor 14 are generated by currents and are therefore equal, with one advantage of having equal currents being simplicity of control. However, non-equal currents may be preferable, for instance to compensate for variabilities in rotor magnet strength and stator flux conduction, or to counter gravitational forces on the rotor 14. These variabilities and/or gravity can be accounted for by adjustments in the coil bias currents implemented in computerized control algorithms.

Attractive forces are not able to accomplish the net centering effect of the rotor 14 described in the aforementioned disclosure because the position of the rotor 14 in the center of the stator 12 is in an unstable equilibrium such that the rotor 14 would be attracted to one side or another of the gap 16 between the rotor 14 and the stator 12. By contrast, repulsion is stronger as the rotor 14 is closer to the stator 12, such that if the rotor 14 moves towards the stator 12 in one particular direction, repulsion is strongest in that direction, moving the rotor 14 away from the stator 12. If the repulsion magnetic forces are sufficiently larger than the gravity of the rotor 14, having equal coil currents and equal repulsion forces (for a given rotor-to-stator gap), these forces will be sufficient to move the rotor 14 sufficiently close to center of the stator 12 and thus axially centered on the axis A. If not, the magnetic forces can be deliberately adjusted to have a larger repulsion force where the rotor 14 would naturally gravitate from its own weight. For purposes of this disclosure, a repelling force is defined as a north magnetic stator pole facing a north rotor pole (or south magnetic stator pole facing a south rotor pole), while attractive forces are defined as north magnetic stator pole to south rotor pole (or south magnetic stator pole to north rotor pole). Rotor centering forces may also be generated to work in anti-synchronization to periodic rotor motions (e.g., resonances). This application of "anti-vibration" rotor centering forces will tend to cancel vibrations.

The fact that repulsion forces only (and not attractive forces) provide a stable equilibrium centering the rotor 14 does not preclude the occasional and momentary use of attractive forces, particularly during transients. For instance, it is well within the scope of this invention that when the rotor 14 is at one extreme position (rotor 14 next to or close to stator 12), or moving toward such an extreme position, a repulsion force could be used on one side and an attractive force on the other side. If by way of example, the rotor is moving close to stator pole A4, pole A4 could be energized to create a repulsion force, while the diametrically opposed stator pole A2 is energized to attract the rotor. Such momentary use of attraction could be used to complement a repulsion force to hasten the centering of the rotor.

According to another embodiment of the disclosure, it is possible to use the motor conventional windings and driving inverter (i.e., a power electronics circuit comprising two power switches per phase as well as peripheral circuits, in a conventional configuration known in the art of driving AC motors from a DC bus) and bias the usual phase currents in the conventional windings in a polyphase lubricant supported electric motor to achieve a result similar to that described above. In other words, in this embodiment, the stator coil windings 36 and machine windings are one and the same, and centering coil control power transistors 38 are one and the same as the machine inverter power transistors. This would reduce cost and complexity greatly at the expense of some loss in functionality and control flexibility. However, in a preferred embodiment, each of the stator poles 32 and respective stator coil windings 36 are special poles/windings separate from the conventional poles/windings and arranged in selective locations, such as at positions A1 and A3 aligned along a gravitational force F for the lubricant supported electric motor 10.

Obviously, many modifications and variations of the present disclosure are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A lubricant supported electric motor comprising:
a stator presenting a stator raceway;
a rotor extending along an axis and rotatable relative to said stator and presenting a rotor raceway disposed in spaced relationship with said stator raceway to define a gap therebetween;
a lubricant disposed in said gap for supporting said rotor within said stator;
said rotor including a plurality of rotor poles arranged adjacent said rotor raceway in circumferentially spaced relationship with one another;
said stator including a plurality of stator poles extending radially towards said rotor in circumferentially spaced relationship with one another along said stator raceway; and
a plurality of stator coil windings each distinctly wrapped around a respective one of said plurality of stator poles and individually controllable for generating a magnetic force to center said rotor relative to said stator; and
a plurality of power transistors each individually disposed in electrical communication with a respective one of said plurality of stator windings and configured to individually drive current through said respective one of said plurality of stator windings to effectuate said individualized control of each one of said plurality of stator coil windings.

2. The lubricant supported electric motor as set forth in claim 1, wherein said plurality of rotor poles includes at least one set of diametrically opposed rotor north poles and at least one set of diametrically opposed rotor south poles disposed in circumferentially staggered relationship to one another and said plurality of stator poles includes at least one pair of diametrically opposed stator poles, and wherein said stator coil windings wrapped around each of said diametrically opposed stator poles are configured to generate a repelling magnetic force in response to at least one of said sets of diametrically opposed rotor north or south poles being disposed adjacent and radially aligned with said at least one pair of diametrically opposed stator poles.

3. The lubricant supported electric motor as set forth in claim 2 wherein said stator coil windings wrapped around each of said diametrically opposed stator poles are biased to create magnetic north stator poles in response to said at least one of said set of diametrically opposed rotor north poles being disposed adjacent and radially aligned with said at least one pair of diametrically opposed stator poles for magnetically centering said rotor within said stator.

4. The lubricant supported electric motor as set forth in claim 2 wherein said stator coil winding wrapped around each of said diametrically opposed stator poles are biased to create magnetic south stator poles in response to said at least one of said set of diametrically opposed rotor south poles being disposed adjacent and radially aligned with said at least one pair of diametrically opposed stator poles for magnetically centering said rotor within said stator.

5. The lubricant supported electric motor as set forth in claim 2, wherein said plurality of power transistors are configured to individually drive current through said at least one set of diametrically opposed stator poles for alternating said at least one set of diametrically opposed stator poles between a north stator pole and a south stator pole arrangement.

6. The lubricant supported electric motor as set forth in claim 5, further comprising a controller disposed in electrical communication with said plurality of power transistors and configured to operate said plurality of power transistors based on a condition of the lubricant supported electric motor.

7. The lubricant supported electric motor as set forth in claim 6, wherein said at least one set of diametrically opposed stator poles are radially aligned with a gravitational force acting on the lubricant supported electric motor, and said controller is configured to operate said plurality of power transistors during an "un-park" initialization of the lubricant supported electric motor for lifting said rotor and magnetically centering said rotor within said stator.

8. The lubricant supported electric motor as set forth in claim 5, wherein said plurality of power transistors are connected to a DC bus and arranged adjacent said plurality of stator coils.

9. The lubricant supported electric motor as set forth in claim 1, wherein said rotor is operably connected to a final drive device that is interconnected to a wheel of a vehicle.

10. The lubricant supported electric motor as set forth in claim 1, wherein said rotor is rotatably disposed within said stator.

* * * * *